US012561957B2

(12) United States Patent
Sanvoravong et al.

(10) Patent No.: US 12,561,957 B2
(45) Date of Patent: Feb. 24, 2026

(54) SYNTHETIC DATA GENERATION OF IMAGE TRAINING DATA

(71) Applicant: Florida Power & Light Company, Juno Beach, FL (US)

(72) Inventors: Khamsouksavanh Sanvoravong, Palm Beach Gardens, FL (US); Mackenzie Vecchio, Boca Raton, FL (US); Kyle A. Bush, Palm Beach Gardens, FL (US); Eric Schwartz, Palm Beach Gardens, FL (US); Michael Wenell, Jupiter, FL (US); Kent A. Logue, Jacksonville, FL (US); Samuel T Hammermaster, Reston, VA (US); Jordan Wilkerson, Fort Pierce, FL (US); Erin Murphy, St. Petersburg, FL (US); Gage Irwin, Gulf Breeze, FL (US)

(73) Assignee: Florida Power & Light Company, Juno Beach, FL (US)

( * ) Notice: Subject to any disclaimer, the term of this patent is extended or adjusted under 35 U.S.C. 154(b) by 344 days.

(21) Appl. No.: 18/295,358

(22) Filed: Apr. 4, 2023

(65) Prior Publication Data

US 2024/0338931 A1 Oct. 10, 2024

(51) Int. Cl.
G06V 10/774 (2022.01)
G06T 5/50 (2006.01)
G06V 20/64 (2022.01)

(52) U.S. Cl.
CPC ............. G06V 10/774 (2022.01); G06T 5/50 (2013.01); G06V 20/64 (2022.01); G06T 2207/20221 (2013.01); G06V 2201/12 (2022.01)

(58) Field of Classification Search
CPC .. G06V 10/774; G06V 20/64; G06V 2201/12; G06T 5/50; G06T 2207/20221
See application file for complete search history.

(56) References Cited

U.S. PATENT DOCUMENTS 7,747,364 B2 6/2010 Roy et al.
8,032,265 B2 10/2011 He
(Continued)

OTHER PUBLICATIONS

Leandro Mattioli et al., "2D-3D Spatial Registration for Remote Inspection of Power Substations, Nov. 2020, Energies, MDPI" (Year: 2020).*
(Continued)

*Primary Examiner* — Chineyere Wills-Burns
*Assistant Examiner* — Phuong Hau Cai
(74) *Attorney, Agent, or Firm* — TROUTMAN PEPPER LOCKE LLP; Dustin B. Weeks; Bo Yang

(57) ABSTRACT

Systems and methods to generate synthetic images for use in a machine learning training set. The process begins with accessing a database of real-world 3-D images of equipment in a power grid, the 3-D images of equipment include 3-D measurements to create a dimensionally accurate and photorealistic model of the equipment. Optionally, the 3-D images could be aged or weathered using imaging editing software. Next, a database of real-world photographs of scenes in which the equipment is installed is accessed. Optionally, the identical scenes can be captured at different times of day, different times of the year, and at different perspectives. Next, using image editing software, the 3-D images of equipment is inserted into at least one of the scenes to form a synthetic image based on a combination of the equipment and the scene in which each of the equipment and the scene were previously captured independently of each other.

14 Claims, 7 Drawing Sheets

(56) References Cited

U.S. PATENT DOCUMENTS

| | | | |
|---|---|---|---|
| 8,422,797 B2 | 4/2013 | Heisele et al. | |
| 8,838,511 B2 | 9/2014 | Kristal et al. | |
| 9,031,317 B2 | 5/2015 | Yakubovich et al. | |
| 9,213,892 B2 | 12/2015 | Heisele | |
| 10,019,652 B2 | 7/2018 | Wang et al. | |
| 10,210,631 B1 | 2/2019 | Cinnamon et al. | |
| 10,277,859 B2 | 4/2019 | Armeni et al. | |
| 10,430,692 B1 | 10/2019 | Farivar et al. | |
| 10,984,286 B2 | 4/2021 | Dundar et al. | |
| 11,094,134 B1 | 8/2021 | Fallin et al. | |
| 11,170,254 B2 | 11/2021 | Wrenninge et al. | |
| 11,257,272 B2 | 2/2022 | Rowell et al. | |
| 11,334,762 B1 | 5/2022 | Wrenninge | |
| 11,488,351 B2 | 11/2022 | Hinterstoisser et al. | |
| 11,507,781 B2 | 11/2022 | Koh et al. | |
| 2020/0388169 A1 | 12/2020 | Barr et al. | |
| 2021/0056768 A1 | 2/2021 | Bleiweiss et al. | |
| 2022/0019852 A1 | 1/2022 | Eyjolfsdottir et al. | |
| 2022/0122001 A1 | 4/2022 | Choe et al. | |
| 2022/0157137 A1 | 5/2022 | Metzler et al. | |
| 2022/0230418 A1 | 7/2022 | Gladisch et al. | |
| 2022/0237410 A1 | 7/2022 | Wrenninge | |
| 2022/0261595 A1 | 8/2022 | Clayton et al. | |
| 2022/0332336 A1 | 10/2022 | Weaver et al. | |

OTHER PUBLICATIONS

"Peng Wu et al., Research on Fast Solution Method for Vibration Prediction of Digital Twin Substation Equipment based on Neural Network Mode, Nov. 2022, IET Science, Measurement & Technology, Institution of Engineering and Technology, Wiley" (Year: 2022).*

"Shaotong Pei et al., Research on 3D Reconstruction Technology of Large-Scale Substation Equipment Based on NeRF, Nov. 2022, STIC Scientific and Technical Information Center, IET Science, Measurement & Technology" (Year: 2022).*

Ma, Preparation of synthetic as-damaged models for post-earthquake BIM reconstruction research Journal of computing in civil engineering 30.3 (2016).

Mcormac Scenenet rgb-d: Can 5m synthetic images beat generic imagenet pre-training on indoor segmentation? Proceedings of the IEEE International Conference on Computer Vision. 2017.

AirSim announcement: This repository will be archived in the coming year. github.io. Accessed Nov. 25, 2022.

Walli et al, Airborne Synthetic Scene Generation (Aerosynth), ASPRS/MAPPS 2009 Fall Conference Nov. 16-19, 2009 San Antonio Texas. 13 Pages.

* cited by examiner

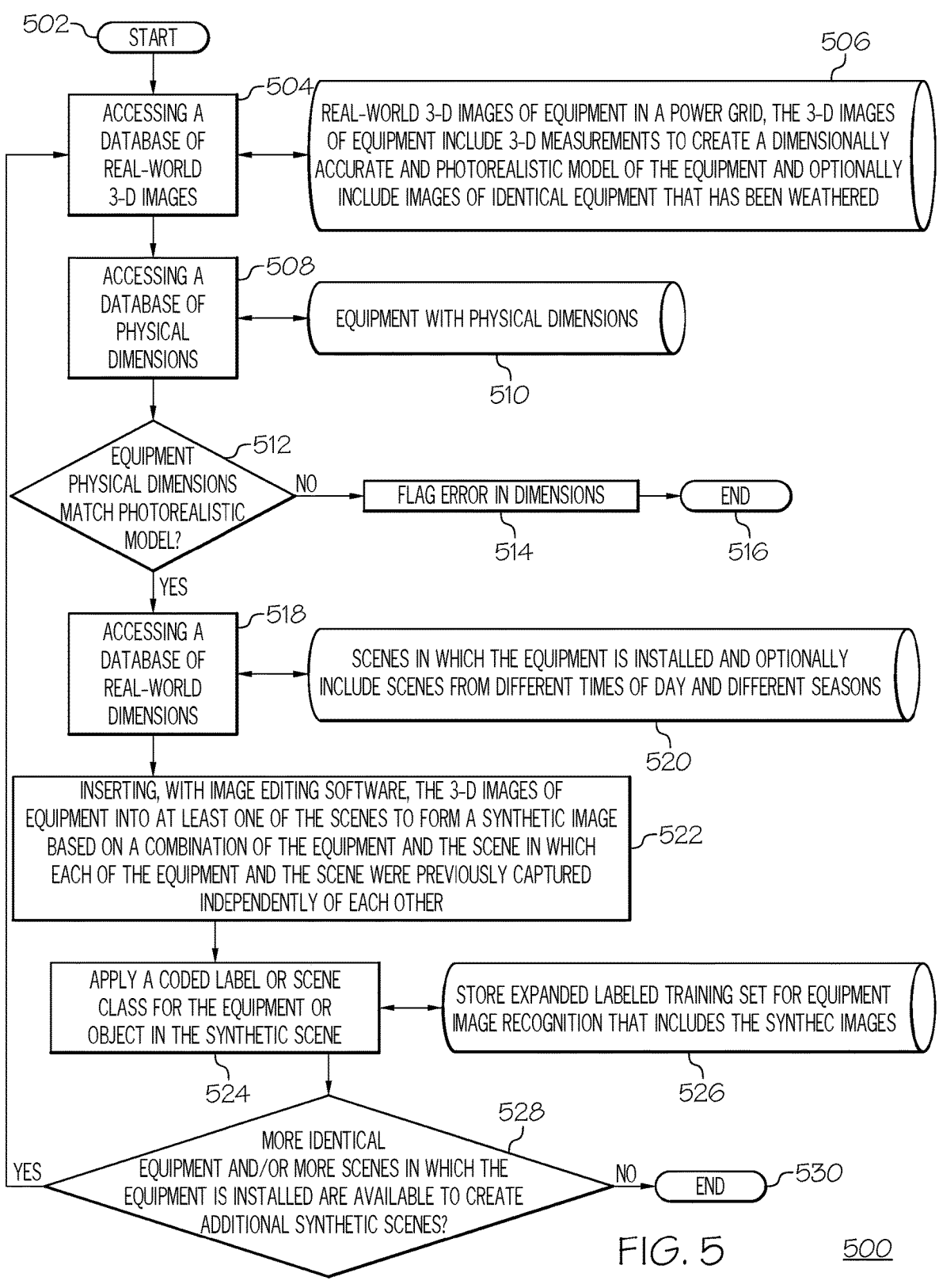

502 — START

504 — ACCESSING A DATABASE OF REAL-WORLD 3-D IMAGES

506 — REAL-WORLD 3-D IMAGES OF EQUIPMENT IN A POWER GRID, THE 3-D IMAGES OF EQUIPMENT INCLUDE 3-D MEASUREMENTS TO CREATE A DIMENSIONALLY ACCURATE AND PHOTOREALISTIC MODEL OF THE EQUIPMENT AND OPTIONALLY INCLUDE IMAGES OF IDENTICAL EQUIPMENT THAT HAS BEEN WEATHERED

508 — ACCESSING A DATABASE OF PHYSICAL DIMENSIONS

510 — EQUIPMENT WITH PHYSICAL DIMENSIONS

512 — EQUIPMENT PHYSICAL DIMENSIONS MATCH PHOTOREALISTIC MODEL?

NO

514 — FLAG ERROR IN DIMENSIONS

516 — END

YES

518 — ACCESSING A DATABASE OF REAL-WORLD DIMENSIONS

520 — SCENES IN WHICH THE EQUIPMENT IS INSTALLED AND OPTIONALLY INCLUDE SCENES FROM DIFFERENT TIMES OF DAY AND DIFFERENT SEASONS

522 — INSERTING, WITH IMAGE EDITING SOFTWARE, THE 3-D IMAGES OF EQUIPMENT INTO AT LEAST ONE OF THE SCENES TO FORM A SYNTHETIC IMAGE BASED ON A COMBINATION OF THE EQUIPMENT AND THE SCENE IN WHICH EACH OF THE EQUIPMENT AND THE SCENE WERE PREVIOUSLY CAPTURED INDEPENDENTLY OF EACH OTHER

524 — APPLY A CODED LABEL OR SCENE CLASS FOR THE EQUIPMENT OR OBJECT IN THE SYNTHETIC SCENE

526 — STORE EXPANDED LABELED TRAINING SET FOR EQUIPMENT IMAGE RECOGNITION THAT INCLUDES THE SYNTHEC IMAGES

528 — MORE IDENTICAL EQUIPMENT AND/OR MORE SCENES IN WHICH THE EQUIPMENT IS INSTALLED ARE AVAILABLE TO CREATE ADDITIONAL SYNTHETIC SCENES?

YES

NO

530 — END

FIG. 5        500

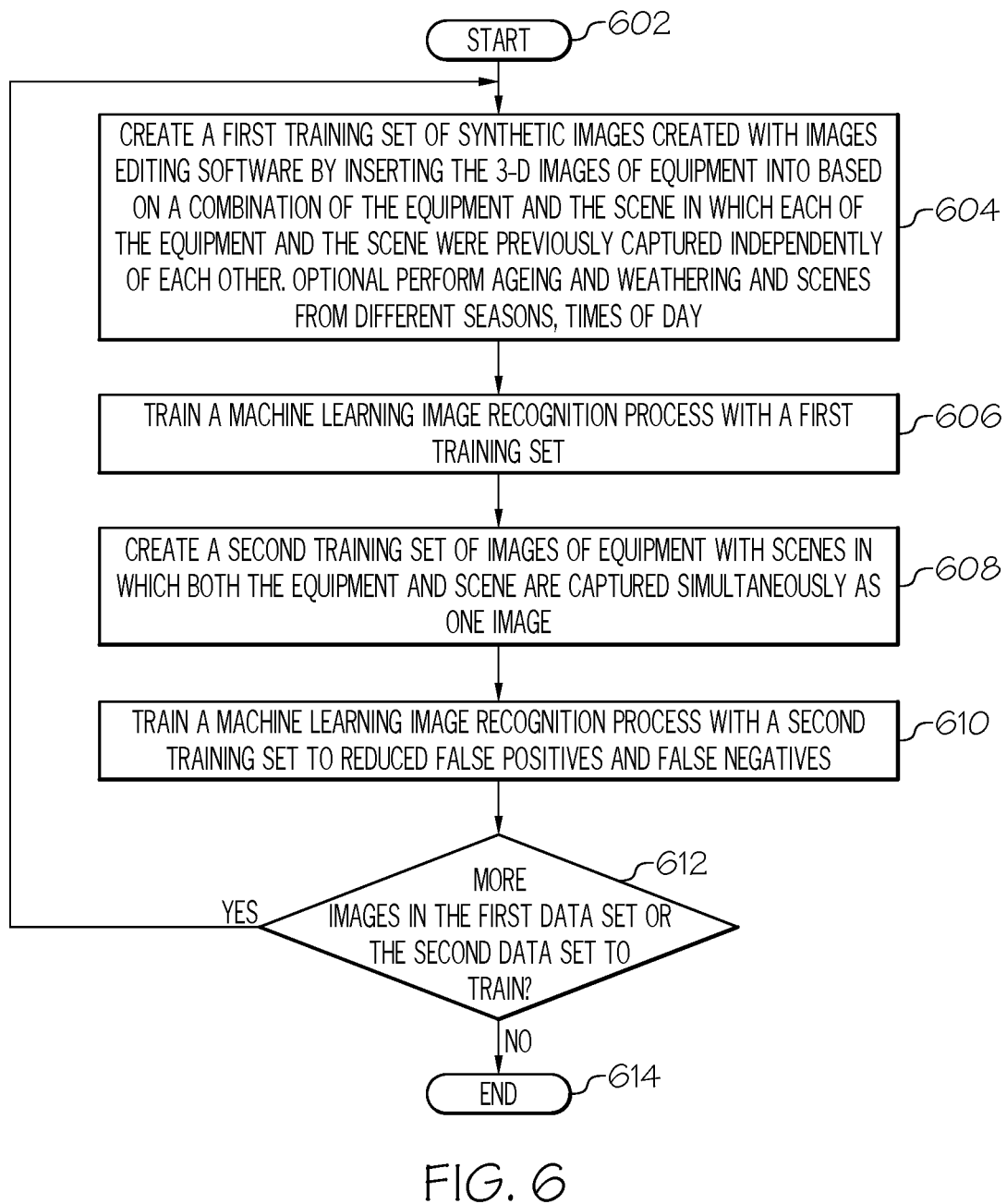

START ⌐602

CREATE A FIRST TRAINING SET OF SYNTHETIC IMAGES CREATED WITH IMAGES EDITING SOFTWARE BY INSERTING THE 3-D IMAGES OF EQUIPMENT INTO BASED ON A COMBINATION OF THE EQUIPMENT AND THE SCENE IN WHICH EACH OF THE EQUIPMENT AND THE SCENE WERE PREVIOUSLY CAPTURED INDEPENDENTLY OF EACH OTHER. OPTIONAL PERFORM AGEING AND WEATHERING AND SCENES FROM DIFFERENT SEASONS, TIMES OF DAY ⌐604

TRAIN A MACHINE LEARNING IMAGE RECOGNITION PROCESS WITH A FIRST TRAINING SET ⌐606

CREATE A SECOND TRAINING SET OF IMAGES OF EQUIPMENT WITH SCENES IN WHICH BOTH THE EQUIPMENT AND SCENE ARE CAPTURED SIMULTANEOUSLY AS ONE IMAGE ⌐608

TRAIN A MACHINE LEARNING IMAGE RECOGNITION PROCESS WITH A SECOND TRAINING SET TO REDUCED FALSE POSITIVES AND FALSE NEGATIVES ⌐610

⌐612 MORE IMAGES IN THE FIRST DATA SET OR THE SECOND DATA SET TO TRAIN?

YES

NO

END ⌐614

SYNTHETIC DATA GENERATION OF IMAGE TRAINING DATA

FIELD OF THE DISCLOSURE

The present disclosure generally relates to creating data sets that are suitable for training automated image recognition processes and, more particularly to producing sets of image recognition training images using synthetically generated images.

BACKGROUND

The size, geographic diversity, environmental diversity, and the multitude of components that comprise the power grid present unique challenges in the rapid and efficient upgrading of the system with diverse new technologies that realize America's objective of improved power grid reliability and hardening. Accordingly, utility systems are an integral part of modern-day life. Unfortunately, components of these systems may become inoperable. For example, consider an electrical power substation that is part of a power grid. Substations perform various functions, such as transforming voltage, connecting two or more transmission lines, transferring power, and protecting the grid from short circuits and overload currents. In many instances, substation equipment is susceptible to damage, which may result in power outages throughout the grid. Power outages decrease customer satisfaction, and damaged substation equipment increases costs incurred by the utility provider.

NextEra Energy, Inc. owns Florida Power & Light Company (FPL), an electric utility that provides power in Florida. FPL is currently performing over 120,000 unmanned aerial systems (UAS)/unmanned aerial vehicle (UAV) flights annually that are manually planned and executed. Currently, for each flight, a human tries to create the most efficient flight path, determine the data collection points and plan for differing environmental considerations.

Existing Computer Vision algorithms are already being trained to detect failed power grid electrical equipment. However, many FPL components are being relocated underground or partially into the ground to help harden the power grid during storms like hurricanes. Image recognition of electrical equipment, such as pad-mounted components, will soon be necessary.

Automated systems that support and perform computer vision and image recognition, such as those that include artificial intelligence (AI), and machine learning processing, can be provided with an image of an object of interest, such as power grid electrical equipment and identify the object that is in the image. Such processing is useful for automatically identifying or classifying the object or objects that are captured in each of a large number of images.

In some examples, automated artificial intelligence-based image recognition processes are initially trained to recognize particular objects by providing training data sets to train the image recognition model. Such training data sets include a number of images of objects that the machine learning system is to identify. Each of these images also has a label that identifies the object in the image and may also have the labeled object highlighted in some way to facilitate the machine learning algorithm in identifying the object One technique to achieve high-performing image recognition in deep learning models is to increase the training dataset, usually to the range of 1,000 to 1,000,000 images (if not more), depending on the problem objective. The dataset must be comprised of objects in various conditions, e.g., damaged, worn, and new, as well as those objects in various "scenes", e.g., backgrounds, lighting, orientation, zoom, and environments.

To obtain real-world examples of these different scenarios is an arduous and time-consuming task. Omission of images in these different scenarios when training image recognition models often leads to low-confidence models, causing false positives. Thus, the models become unusable and provide little to no value.

A current solution on the market is to generate "synthetic" scenes rendered using game engines to look like real-world images. These still have issues because they are not real-world pictures and do not replicate the attributes captured from a camera of real-world scenes.

Current state-of-the-art techniques leverage the 3D captures with LiDAR and photogrammetry. However, the scene in which these 3D objects are placed is also computer-generated. The final composite image may not be representative of the actual model input. Therefore, AI algorithms may only see incremental gains using this technique.

SUMMARY OF THE INVENTION

Systems and methods to generate synthetic images for use in a machine learning training set. The process begins with accessing a database of real-world 3-D images of equipment in a power grid, the 3-D images of equipment include 3-D measurements to create a dimensionally accurate and photorealistic model of the equipment. Optionally, the 3-D images could be aged or weathered using imaging editing software. Also optionally, using one or more features of the equipment to search an equipment specification database with physical dimensions. The process confirms that the physical dimensions are within a threshold of the 3-D measurements.

Next, a database of real-world photographs of scenes in which the equipment is installed is accessed. Optionally, the identical scenes can be captured at different times of day, different times of the year, and at different perspectives. Next, using image editing software, the 3-D images of equipment are inserted into at least one of the scenes to form a synthetic image based on a combination of the equipment and the scene in which each of the equipment and the scene were previously captured independently of each other.

In one example, the method further comprises appending the synthetic image to a training dataset comprising synthetic images having a common image scene class, wherein the training dataset is used for training a machine learning system to perform a computer vision task. This may include inserting a classifier based on the 3-D images of equipment inserted into the scenes. In another example, a machine learning algorithm is trained using the training dataset with synthetic images. Optionally, the process includes accessing a database of real-world images of equipment with scenes. The machine learning algorithm is trained using real-world images of equipment with scenes.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 illustrates a process flow of machine learning image training set creating, according to an example;

FIG. 6 illustrates an image recognition training with synthetic images, according to an example.

DETAILED DESCRIPTION

Figure 1:
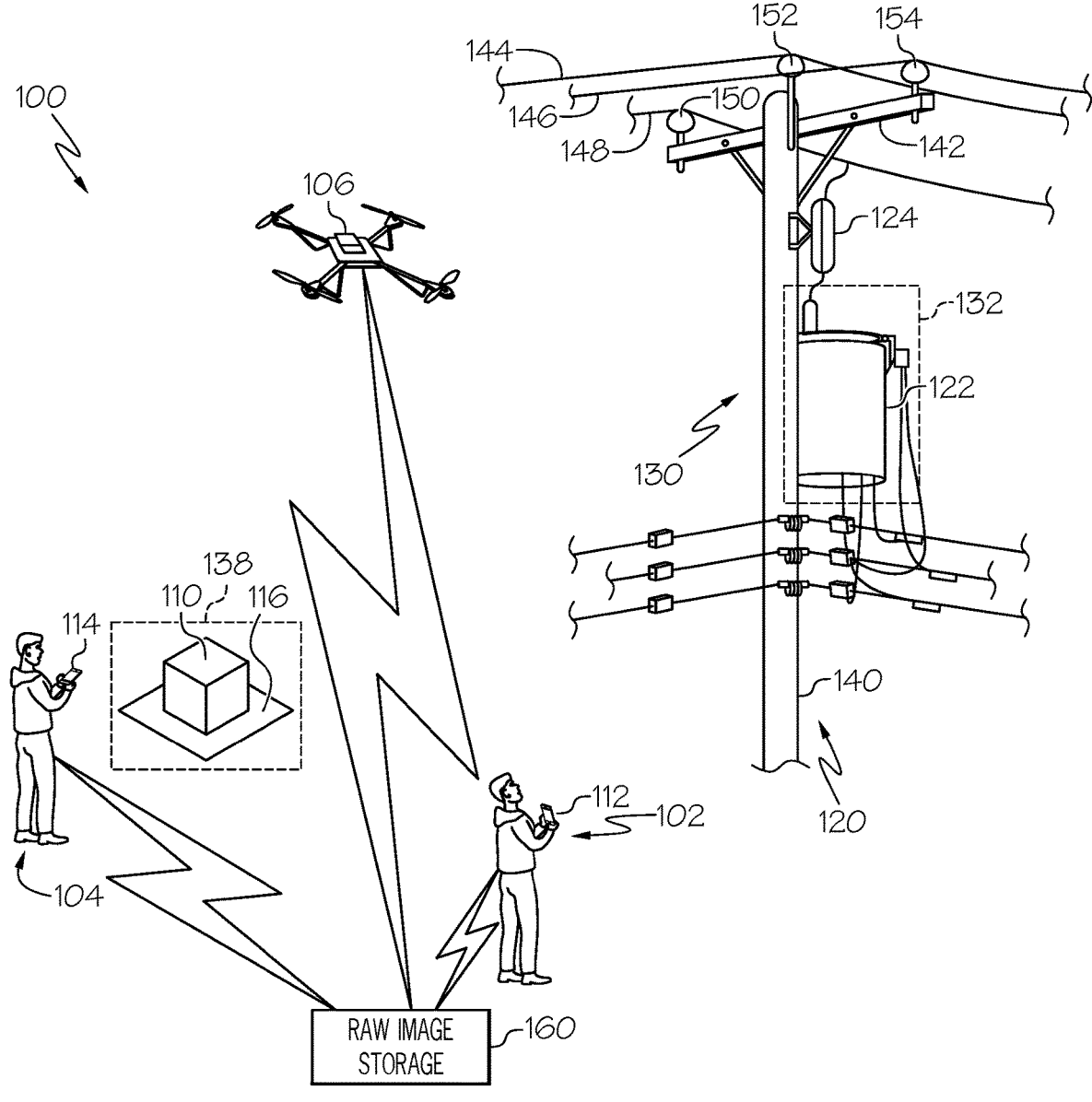
FIG. 1 illustrates an equipment image capture environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

Non-Limiting Definitions

The term "3-D measurements" are measurements, typically non-contact measurements, taken of an object to create a 3-D point cloud of an object that is dimensionally accurate and a photorealistic model of the object, such as through photogrammetry.

The terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carry out a given function.

The term "another", as used herein, is defined as at least a second or more.

The term "class" or "classifier" or "label" is a class label applied to data input in a machine learning algorithm.

The term "configured to" describes hardware, software or a combination of hardware and software that is adapted to, set up, arranged, built, composed, constructed, designed, or that has any combination of these characteristics to carry out a given function.

The term "coupled," as used herein, is defined as "connected," although not necessarily directly, and not necessarily mechanically.

The term "inspection parameters" means any type of data to capture, including angles, field-of-view, resolution, and position at which to capture images.

The term "image editing software" means software for editing and manipulating images, such as Blender.org or Photoshop from Adobe.

The terms "including" and "having," as used herein, are defined as comprising (i.e., open language).

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "optimization" means selecting a flight path segment that best meets the requirement for that specific segment. For example, suppose there is a flight path segment from point A to point B and back to point A. The flight path from point A to point B may closely follow the components, including powerlines of a power grid to monitor the equipment within a certain distance during the inspection itself. This path from point A to point B may not be in a straight line. However, when the flight path segment from point B to point A is generated, there is no need to inspect the components, and the flight path back may be at a higher altitude and along more of a straight path to preserve the battery life of the UAV.

The term "photogrammetry" is a technique to extract three-dimensional measurements of an object for obtaining reliable information, such as three-dimensional measurements, through processing and interpreting a series of photographic images. Photogrammetry may be complemented by techniques like LiDAR, laser scanners (using time of flight, triangulation or interferometry), white-light digitizers and any other technique that scans an area and returns x, y, z coordinates for multiple discrete points, commonly called "point clouds".

The term "real-world" means existing in reality, as opposed to one that is virtual, imaginary, simulated, or theoretical.

The term "simultaneous" means computations are carried out at the same time, which for larger data sets with various constraints is not possible to be carried out completed by a group of humans and must be performed by a computer. For example, one human could not compute one simulation with all the constraints for ten crews across fifty jobs. It is infeasible for a human to calculate one simulation loop with one constraint, let alone perform it in parallel to a sort of global optimum.

The term "synthetic" means creating a computer-generated composite scene including equipment and background in which each of the equipment and the background scene were previously captured independently of each other.

The term "uniform data format" means data in a given format, whether date format, time format, currency format, scientific format, text format, or fractional format, so that all values of data are presented in a single consistent format for a given category or criteria.

The term "unmanned aerial systems" (UAS) and "unmanned aerial vehicle" (UAV) refers to piloted, autonomous, and semi-autonomous aircraft.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Overview

Disclosed is a system, method, and computer readable medium for creating a synthetic training dataset that is used with an image recognition system for detecting issues with electrical grid equipment.

The present invention places a 3D photorealistic asset in a real-world scene. A computer-vision model training supplemented with synthesized images to improve image recognition of objects from real-world backgrounds, given the nuanced effects of photography/videography such as lighting, color, luminesce, reflectance, etc.

In one example, the present invention includes three major steps.

Step One: Use LiDAR and photogrammetry stitching, such as with Pix4d.com software, to capture real-world pictures of the object to create a dimensionally accurate and photorealistic model of the object. This object is now a real live 3D object that can be inserted in real scenes.

In addition, additional "damage" or other wear conditions are applied to the object.

Step Two: Collect using real-world images or scrape imagery from open-source imagery datasets that represent the desired "scenes" that the 3D object will be inserted into.

Step Three: Insert the 3D object into the scene and adjust the object's position, lighting, textures, and condition to best match the scene using modeling software such as blender.org. The different object orientations, perspectives, color, and textures, i.e., damage, wear, etc., can be rendered as training images for the model creation. This allows image (tiff, gif, jpeg, png, etc.) generation to be automated at high volume and high quality as it is a blending of two real-world image sources. These images will provide a quality training dataset for the model to achieve high-accuracy and high-performance models for real-world use cases.

Overview of Labeling Objects in Image

The below systems and methods include and provide processing and techniques that improve the efficiency of creating machine learning training sets with labeled objects, such as power grid electrical equipment, that are to be used to train a machine learning image recognition process. These systems and methods are useful for increasing the assurance that the same label or class is assigned to different images or segment of the image, of a particular type of object by creating synthetic images of objects that are labeled. These systems and methods further facilitate one or more examples of objects with real-world backgrounds in which the objects themselves can be altered with lighting, color, luminesces and reflectance. In an example, these systems and methods are able to be used to create a training data set for a machine learning image recognition system. By increasing the assurance that images with various nuanced effects of the same particular type of object all have the same label, the efficacy of training a machine learning image recognition process is improved. Using these multiple images of that particular type of object that all have the same label as a training data set for a machine learning image recognition processing allows for improved feature detection training of that machine learning image recognition processing by using more example images to better train the image recognition process to accurately recognize that particular type of object.

In an example, the below described systems and methods provide a facility for a person to highlight an object of interest in a displayed image and enter a defined label that uniquely describes the particular type of object captured in the displayed image. In an example, the label entered by the person reviewing the image is defined according to a code system that was created to allow easy classification of objects within the image.

In an example, the below described systems and methods are used by a system used to monitor equipment deployed by an electrical utility to train a machine learning image recognition system to identify images of pieces of equipment that are deployed in the field by that electrical utility. These systems and methods define a coded labeling definition that defines a respective numeric code that corresponds to each respective type of each piece of equipment that can be captured by images that are to be labeled. In an example, the coded labeling definition assigns a unique multiple-digit code to each broad type of equipment. In an example, each type of equipment is assigned a general category that is identified by a two-digit code, and subtypes in each of those general categories are in turn, each assigned a two-digit subtype code.

In defining the code, each type of equipment is given a two-digit, high-level equipment code (sometimes referenced as an 'eq code'). From there, each type of equipment has an additional, two-digit subtype codes. In an example, the two-digit subtype codes denote differences in material, usages, or placement on poles or lines. In an example, the defined coded labeling definition defines coded labels for each type of pieces of equipment that are within a defined number of types of pieces of equipment. In an example, a first two-digit subtype code indicates a category of types of pieces of equipment, and the second two-digit subtype code indicates a subcategory of types of pieces of equipment in the respective first two-digit subtype code.

The use of these simplified labeling conventions in the below described systems and methods, where each type of equipment is depicted in a catalog or other reference material provided to the person performing the labeling, allows efficient and accurate labeling by relatively inexperienced persons. In an example, such labeling is able to be accurately and consistently performed for a large number of images through crowdsourcing or through machine learning, such as artificial intelligence. In an example, a large group of persons are able to be offered the opportunity to review and label a few images of equipment in exchange for some benefit or payment.

Image Capture Environment

FIG. 1 illustrates an equipment image capture environment 100, according to an example. The equipment image capture environment 100 depicts a small sample of equipment that is deployed by an electrical utility as part of its electrical distribution system. The equipment image capture environment 100 also depicts persons and other image collection assets that are used to capture images of this equipment.

There are two distinct types of image capture possible. The first type is 3-D images of equipment in a power grid using photogrammetry. The 3-D images of equipment include 3-D measurements to create a dimensionally accurate and photorealistic model of the equipment. Photogrammetry may be complemented by techniques like LiDAR, laser scanners (using time of flight, triangulation or interferometry), white-light digitizers and any other technique that scans an area and returns x, y, z coordinates for multiple discrete points, commonly called "point clouds".

The second type of image capture are real-world photographs of scenes in which the equipment is installed. The techniques described here could be for either type of image.

The equipment image capture environment 100 includes an electric power line distribution pole and equipment 120 that includes a vertical pole 140 with various components 130 installed near the top of the vertical pole 140. A horizontal crossbeam 142 is mounted near the top of the vertical pole 140 to support three (3) electrical power lines, a first electrical power line 144, a second electrical power line 146, and a third electrical power line 148. The components 130 include an overcurrent protection device 124 and a transformer 122. Conductors connect one terminal of the overcurrent protection device 124 to the third electrical power line 148 and the other terminal of the overcurrent protection device 124 to an input of the transformer 122.

Each electrical power line is attached to the horizontal crossbeam 142 by a respective insulator. The first electrical power line 144 is attached to the horizontal crossbeam 142 by a first insulator 150, a second electrical power line 146 is attached to the horizontal crossbeam 142 by a second insulator 152, and a third electrical power line 148 is attached to the horizontal crossbeam 142 by a third insulator 154.

A first observer 102 captures one or more images with a first camera 112 that each contains one or more pieces of equipment within the components 130. For example, a first image 132 captures an image of transformer 122, a second image 134 captures the overcurrent protection device 124, and a third image 136 captures the horizontal crossbeam 142 and the three (3) insulators, the first insulator 150, the second insulator 152, and the third insulator 154.

FIG. 1 further illustrates a pad-mounted transformer 110 that is mounted on a pad 116. A second observer 104 captures a fourth image 138 of the pad mounted transformer 110 with a second camera 114.

In various examples, images of various different pieces of equipment that are deployed by an electric utility are able to be captured by any suitable technique. As described above, observers are able to capture images by handheld cameras. In alternative examples, other image capture platforms are able to be used such as one or more cameras mounted on a drone or unmanned aerial systems (UAS) 106, cameras mounted on various types of aircraft, on various types of ground vehicles, on other platforms, or on combinations of these.

Figure 2:
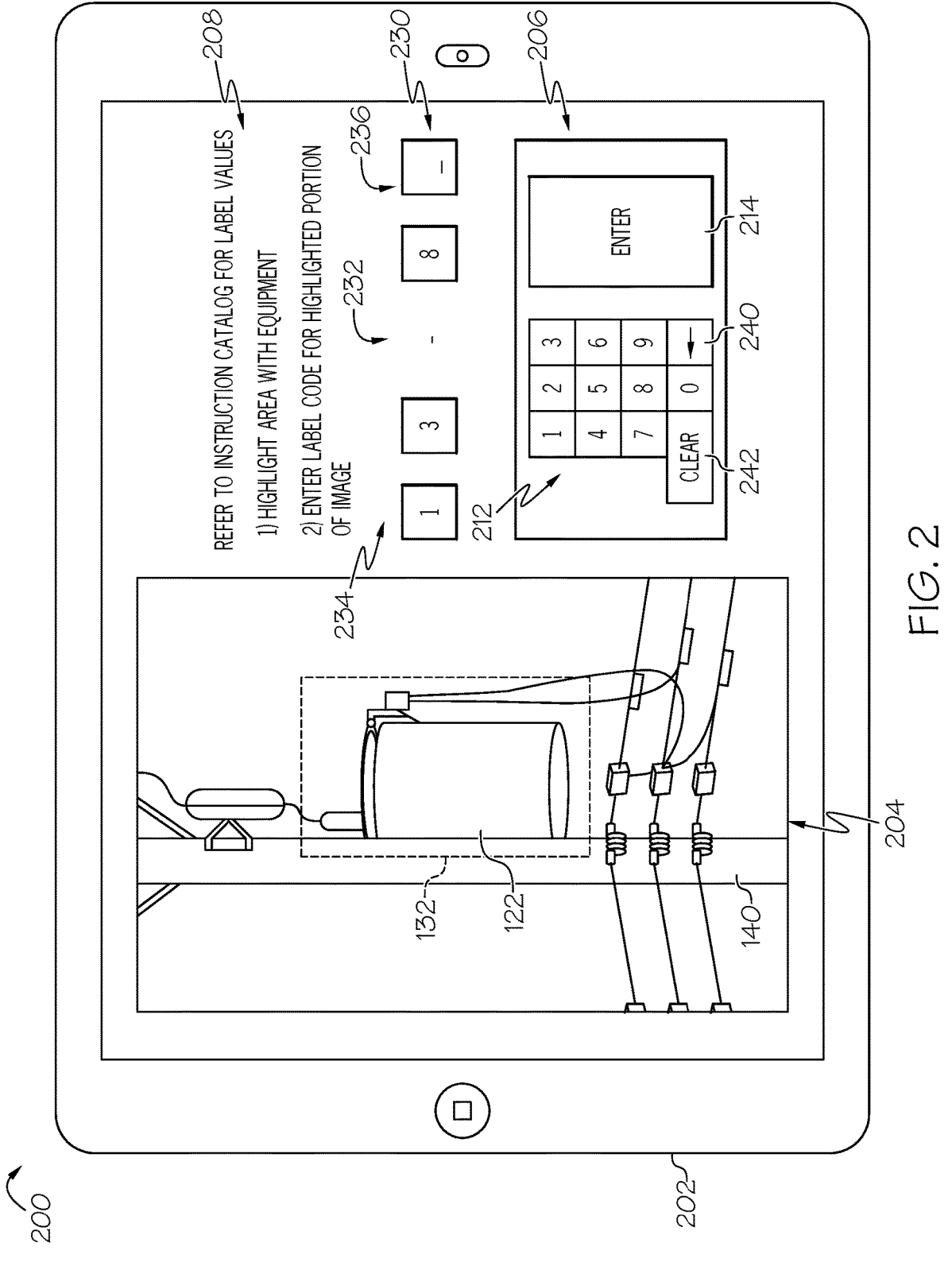
FIG. 2 illustrates a user interface device, according to an example.

In an example, the images captured by the first camera 112 and the second camera 114, potentially other cameras or other image capture platforms, or combinations of these, are collected by being sent to a raw image storage 160. The images collected into the raw image storage 160 in an example are images that capture views of equipment that are able to be different types of piece of equipment within the defined number of types of pieces of equipment for which the defined coded labeling definition is defined.
Labeling of Images FIG. 2 illustrates a user interface device 200, according to an example. The user interface device 200 is an example of the above discussed image labeling user interface device 170. The illustrated user interface device 200 includes facilities to present images and other user interface elements on a touch sensitive display screen 202. The user interface device 200 is an example of a device that presents an image to a user, allows the user to view and inspect the presented image, highlight an area of interest in the presented image, and enter a coded label for the image. In an example, the user interface device 200 is used to present uncategorized or unlabeled images and allows a user to enter a coded label for a portion of that that image that the user may be able to highlight in order to allow that labeled image to be used as part of a training data set for a machine learning image recognition system. The description of the user interface device 200 refers to the above description of the equipment image capture environment 100.

The user interface device 200 includes a touch screen display 202 that presents images and allows a user to provide inputs by touching various user interface elements presented on the touch screen display 202. In further examples, similar user interface devices are able to have other user input and output facilities such as physical buttons or other devices to allow a user to provide input, voice or gesture input facilities, other facilities, or combinations of these.

The touch screen display 202 includes an image display area 204 that presents an image to the user. In an example, images presented in the image display area 204 include raw images of pieces of equipment as are discussed above. The depicted image display area 204 is shown to contain the first image 132 that includes an image of a vertical pole 140 and a transformer 122. A highlighted region 222 is shown that is depicted as a dashed circle 220 around the portion of the depicted first image 132 that includes the transformer 122. In an example, this dashed circle 220 is able to added by a user of the user interface device 200 by any suitable technique. For example, the user may use his or her finger or a stylus to draw a circle within the image display area 204 of the touch screen display 202 to highlight that portion of the displayed image. In further examples, other user input facilities are able to be provided to allow a user to enter an indication of a highlighted region of the image display area 204.

The touch screen display 202 in this example includes an instruction area 208 that indicates to the user that a code should be entered that corresponds to the image presented in the image display area 204. The instruction area 208 also includes a reminder to the user to "refer to the instruction catalog for label values." In an example, users are provided with a catalog or other reference material that includes images of types of equipment that are to be labeled along with tips for identifying that equipment and the label that is to be given to images that include that particular type of equipment. In an example, each piece of equipment in the instruction catalog has the coded label value that is to be associated with images containing that piece of equipment.

The touch screen display 202 includes a keypad input 206. The keypad input includes a 3×4 key array 212 that has ten (10) numeric keys labeled 0-9 and also includes a backspace key 240 and a clear key 242. The keypad input 206 also has an enter key 214 that allows a user to end the input of label information.

The touch screen display 202 includes an entered label display area 230. The entered label display area 230 is an example of an input interface that receives a received numeric code within a coded labeling definition that corresponds to the particular type of the particular piece of equipment in the present image presented in the image display area 204. The entered label display area 230 displays label information entered by the user via the keypad input 206. The depicted example allows a coded label to be entered that consists of two sub-portions, or subcodes, that each has two (2) digits. The depicted entered label display area 230 includes a first input field 234 is shown as having received a first subcode input that includes the first sub-portion of the coded label has the digits "1" and "3" and a second input field 236 is shown has having received part of second subcode input, that includes the second sub-portion, which is the first digit "8," and is awaiting input for the second digit. The entered label display area 230, which is an example of an input interface, present a separator character 232, which is a dash "-" in this example, between the first input field 234 and the second input field 236. The illustrated coded label includes two subcodes that each have two digits.

In further examples, the coded label is able to have any number of subcodes, and each subcode is able to have a different number of digits where different subcodes have either the same number of digits, different number of digits, or combinations of these. In a further example, each subcode has three (3) digits.

UAV Example

Figure 3:
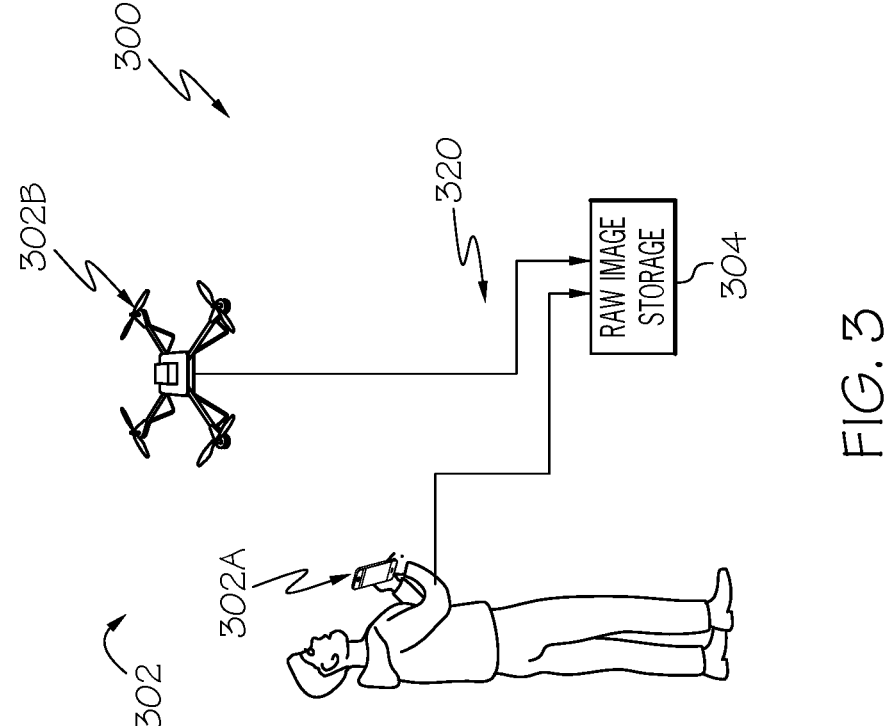
FIG. 3 illustrates an image labeling and processing data flow, according to an example.
Figures 4A, 4B, 4C, 4D, 4E, 4F:
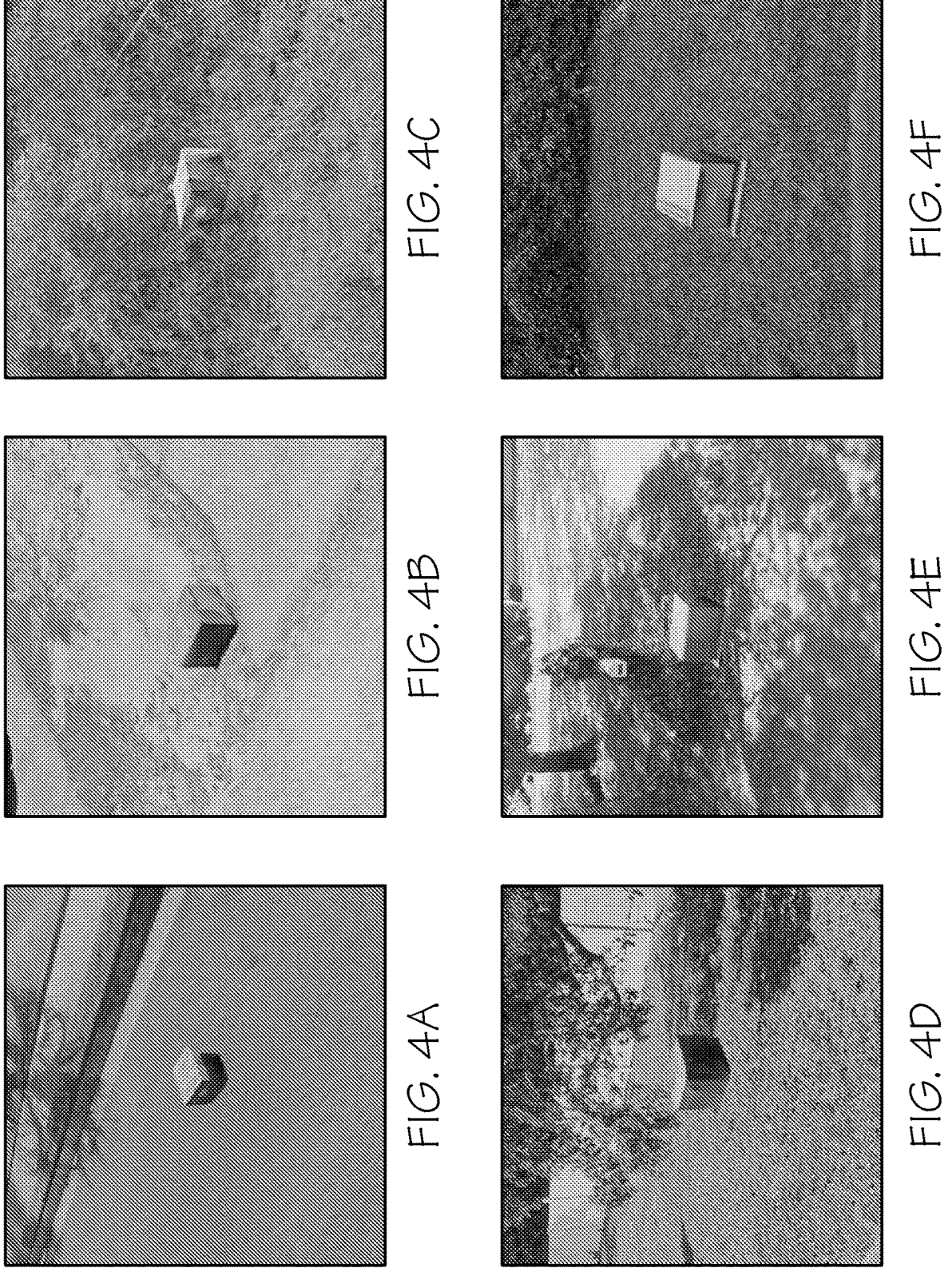
FIG. 4A to FIG. 4F illustrates synthetic images of electrical grid equipment according to an example.

FIG. 3 illustrates an image labeling and processing data flow 300, according to an example. The description of the image labeling and processing data flow 300 refers the above description of the equipment image capture environment 100. The image labeling and processing data flow 300 depicts the processing of images of electrical distribution or transmission equipment. The image labeling and processing data flow 300 depicts processing that supports both processing new images with a machine learning based image recognition program to label equipment captured in those images, and also depicts processing to support creating labeled images to be used as part of a training data set to train a machine learning image recognition program to recognize images of such equipment. In an example, supporting the creation of labeled images includes providing unlabeled images to an image labeling user interface device 170 to allow a user to manually select areas of the image that contain a piece of equipment that is of interest, and to enter a label code that corresponds to that piece of equipment. In general, the image labeling and processing data flow 300 is able to be used to support processing to develop a training data set of manually labeled images to train one or more machine learning based image recognition systems for any application.

The image labeling and processing data flow 300 includes image collectors 302. The illustrated examples of image collectors 302 include a person with camera 302*a* and a drone with camera 302*b*. Raw images 320 are captured by any of the image collectors 302 and are communicated to a raw image storage 304. Images captured by the image collectors 302 are referred to as raw images because they are not labeled or otherwise categorized based upon a determination of equipment or other objects that are captured within those images. In general, images are able to be collected by any one or more suitable techniques and accumulated in any one or more repositories.

Again, as explained above for FIG. 1, there are two distinct types of image capture possible. The first type is 3-D images of equipment in a power grid using photogrammetry. The second type of image capture are real-world photographs of scenes in which the equipment is installed. The techniques described here could be for either type of image.

In one mode of operation, raw images 320 stored in the raw image storage 304 are able to be provided to a user operated image labeling user interface device 170. As described above, the user operated image labeling user interface device 170 in an example presents raw images to a user and allows the user to enter a coded label corresponding to an object captured in the image, and to also identify the area of interest in the image that contains that object. In further examples, any suitable device is able to be used to assist a person in providing a coded label that corresponds to a piece of equipment that is captured in an image being presented to the person labeling an image.

Example Images of Synthetic Training Set Creation

FIG. 4A through FIG. 4F illustrates synthetic images of electrical grid equipment. In this example, a pad-mounted transformer has been weathered and inserted into different background scenes to form a synthetic image in which each of the equipment and the scene were previously captured independently of each other.

Machine Learning Synthetic Image Training Set Creation

FIG. 5 illustrates a process flow 500 of machine learning image training set creation, according to an example. The process begins in step 502 and immediately proceeds in step 504.

In step 504, the process accesses a database of 506 real-world 3D images. The database These images may be captured using the method described above in FIG. 1 through FIG. 3. The database 506 in this example is of real-world 3-D images of equipment in a power grid, the 3-D images of equipment include 3-D measurements to create a dimensionally accurate and photorealistic model of the equipment.

Optionally, database 506 includes real-world 3-D images of identical equipment that has been weathered or aged, either through photo effects using software such as Adobe Lightroom, Blender, PhotoFocus and others. In addition, or instead of, the database may include multiple images of the same equipment with different aging or weathering due to length and location, it is deployed in the field without the use of photo editing software. The process continues to step 508.

Steps 508 and 512 are optional steps. In step 508, a database 510 of equipment with physical dimensions is accessed. These dimensions can be from a manufacturer of the equipment or independently measured. The process continues to step 512.

In step 512, a comparison is made between the equipment's physical measurements from database 510 with those measurements from database 506 with the 3-D images with 3-D measurements. In the event there is a mismatch, a measurement error is flagged in step 514, and the process terminates in step 516. Otherwise, if the two measurements are within a settable tolerance, the process continues to step 518.

In step 518, a database 520 of real-world photographs of scenes in which the equipment is installed is accessed. These scenes may include photographs of the same scene from different angles, different seasons, and different times of the day. The process continues to step 522.

In step 522, using image editing software, insert the 3-D images of equipment into at least one of the scenes to form a synthetic image based on a combination of the equipment and the scene in which each of the equipment and the scene were previously captured independently of each other. Imaging editing software includes Blender, Adobe Photoshop, and others. The process continues to step 524.

In step 524, a coded label or scene class is applied to the equipment or object in the synthetic scene. These are stored in database 526 as the expanded training set. The process continues to step 528.

In step 528, a test is made to determine if more identical equipment and/or more scenes in which the equipment is installed are available to create additional synthetic scenes. If there are more images to synthesize together for a training set, then continue to step 504. Otherwise, if there are no additional images to process, the process ends in step 530.

Image Recognition Training with Synthetic Images

FIG. 6 illustrates an image recognition training with synthetic images 600. The machine learning image recognition system training and operations process 600 begins at step 602 and immediately proceeds to step 604.

In step 604 a first training set is created as described above in FIG. 5. This first training set of synthetic images is created with image editing software by inserting the 3-D images of equipment into based on a combination of the equipment and the scene in which each of the equipment and the scene were previously captured independently of each other. Optional image effects, such as aging, and weathering and scenes from different seasons, and different times of day. The process continues to step 606.

In step 606, the first training set of images that includes synthetically created images as described in FIG. 5 is used to train a machine learning image recognition process. The process continues to step 608.

In step 608, a second training set is created. This second training set includes images of equipment with scenes in which both the equipment and scene are captured simultaneously as one image. The process continued to step 610.

In step 610, the second training set of images that includes equipment with scenes in which both the equipment and scene are each captured simultaneously as one image, as described in FIG. 5 is used to train a machine learning image recognition process. The process continues to step 608. The purpose of this second training set is to reduce the number of synthetic images that were incorrectly recognized (either false positives or false negatives) with the first training set. The process continues to step 612.

In step 612, a test is made to determine if there is more data in the first training set, the second training set, or both to train. If there is additional data, the process loops back to step 604 as shown. Otherwise, the process terminates in step 614.

Image Recognition

In some examples, the machine learning image recognition system in FIG. 6 is able to operate on a computer processor and utilize machine/computer learning to identify particular pieces of equipment that are captured in images collected by various sources and develop machine learning algorithms and models perform inferences with regards to which pieces of equipment are captured within a particular image. In some examples, such machine learning processing operates to identify which elements, such as quantities, values, observations, or other data, are able to serve as distinguishing characteristics of effects that are caused by different incidents, and evaluate these elements in order to determine useful indecent signatures that are able to support inference determinations in identifying pieces of equipment that are present in captured images. In an example, the machine learning algorithms/models are trained using one or more machine learning techniques. For example, in one embodiment, a deep learning artificial neural network (DLANN) model is trained to determine useful characteristics for inclusion into a definition of incident signatures and provide inferences of pieces of equipment that are captured in images being processed. In further examples, other machine learning models are applicable as well. In an example, the training of a machine learning image recognition process includes training the process to automatically associate unlabeled images including an image the particular type of the piece of equipment with the respective numeric code within the coded labeling definition that corresponds to the particular type of the piece of equipment.

A DLANN model is generally comprised of a plurality of connected units referred to as artificial neurons. Each unit is able to transmit a signal to another unit via a connection there between. A unit that receives a signal from another unit processes the signal and may transmit its own signal to another unit based on the processed signal. A unit may be associated with a state (e.g., $0 \leq x \leq 1$) where both a unit and a connection may be associated with a weight that affects the strength of the signal transmitted to another unit. The weight may vary during the learning process of the model. The model may comprise multiple layers of connected units, where different layers perform different transformations on their inputs. The first layer acts as the initial input (e.g., from the inputted data) to the model, where signals from this layer propagate to the final layer (e.g., identified solution). The initial layers of the model may detect specific characteristics of the target solution while inner layers may detect more abstract characteristics based on the output of the initial layers. The final layers may then perform more a complex detection based on the output inner layers to detect the target solution.

The DLANN model utilized by the machine learning image recognition system in an example is trained by providing training data to the model as an input, such as the image recognition training data set hat has been created as described above. The model may be trained on a processor implementing the machine learning image recognition system and/or at an external information processing system.

Computer Hardware

Figure 7:
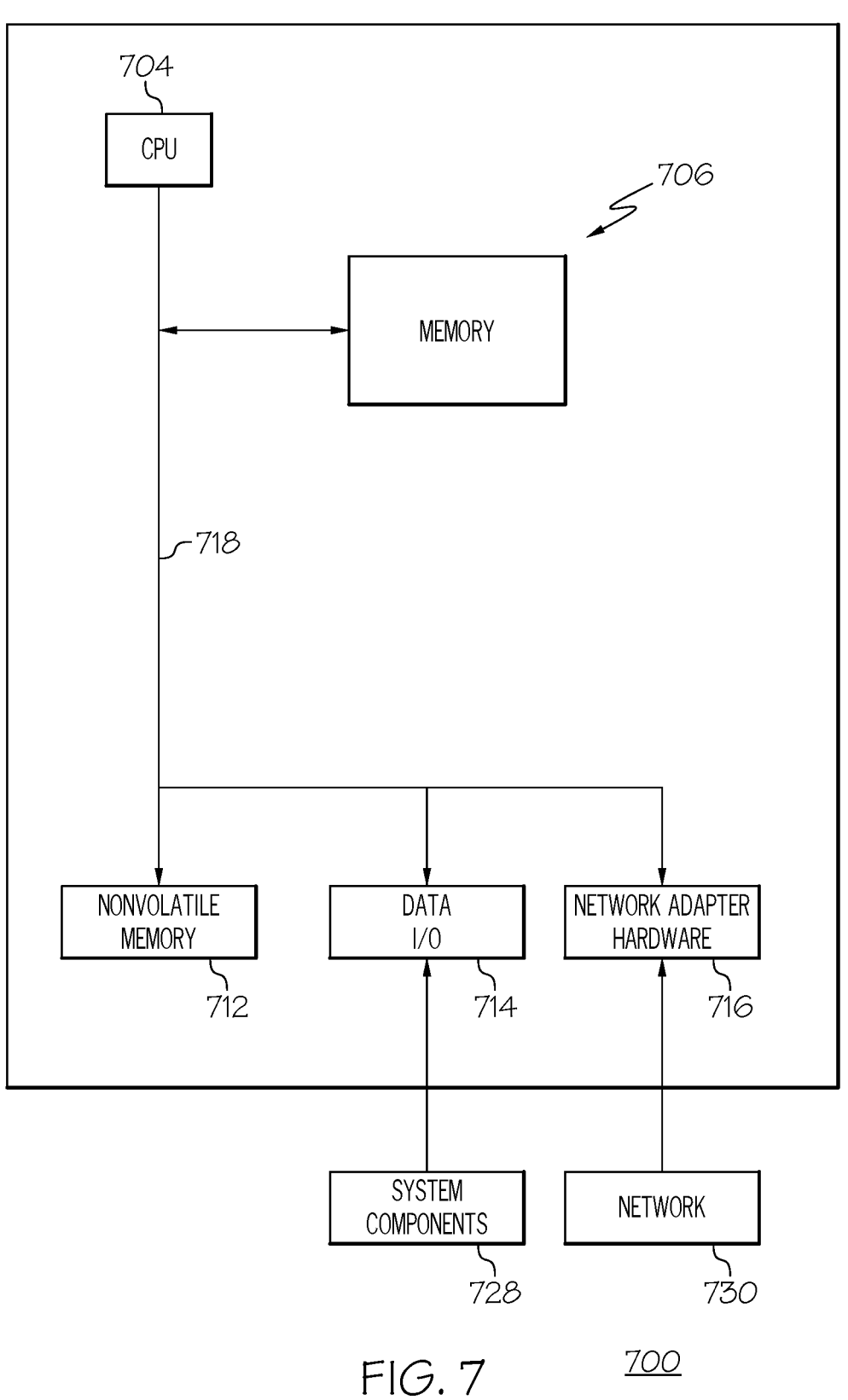
FIG. 7 illustrates a block diagram illustrating a processor, according to an example.

FIG. 7 illustrates a block diagram illustrating a processor 700 according to an example. The processor 700 is an example of a processing subsystem that is able to perform any of the above described processing operations, control operations, other operations, or combinations of these.

The processor 700 in this example includes a CPU 704 that is communicatively connected to a main memory 706 (e.g., volatile memory), a non-volatile memory 712 to support processing operations. The CPU is further communicatively coupled to a network adapter hardware 716 to support input and output communications with external computing systems such as through the illustrated network 730.

The processor 700 further includes a data input/output (I/O) processor 714 that is able to be adapted to communicate with any type of equipment, such as the illustrated system components 728. The data input/output (I/O) processor in various examples is able to be configured to support any type of data communications connections including present day analog and/or digital techniques or via a future communications mechanism. A system bus 718 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which-when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of training a neural network for equipment detection comprising:
   generating a set of synthetic equipment images by:
      accessing a database of real-world 3-D images of equipment in a power grid, the real-world 3-D images of the equipment include 3-D measurements to create a dimensionally accurate and photorealistic model of the equipment;
      accessing a database of real-world photographs of scenes in which the equipment is installed; and
      inserting, with image editing software, at least one of the real-world 3-D images of the equipment into at least one of the scenes to form a synthetic image based on a combination of the equipment and a scene in which each of the equipment and the scene were previously captured independently of each other;
   augmenting the set of synthetic equipment images by applying a random weathering algorithm to the equipment, including one of lighting, color, and luminance, or a combination thereof, to create a modified set of synthetic equipment images;
   creating a first training set comprising the generated set of synthetic equipment images, the modified set of synthetic equipment images, and the set of real-world photographs of scenes obtained from the database;
   training the neural network in a first stage using the first training set;
   creating a second training set for a second stage of training comprising the first training set and the set of real-world images of equipment captured together with surrounding scenes of the real-world images in a single image to reduce detections of synthetic images as equipment images after the first stage of training; and
   training the neural network in the second stage using the second training set.

2. The method of claim 1, further comprising:
   appending the synthetic image to a training dataset comprising synthetic images having a common image scene class, wherein the training dataset is used for training the neural network to perform a computer vision task.

3. The method of claim 2, wherein the appending the synthetic image to the training dataset includes inserting a classifier based on the at least one of the real-world 3-D images of equipment inserted into the at least one of the scenes.

4. The method of claim 1, wherein accessing a database of real-world 3-D images of equipment further includes
   using one or more features of the equipment to search an equipment specification database with physical dimensions; and
   confirming that the physical dimensions are within a threshold of the 3-D measurements.

5. The method of claim 1, wherein the accessing a database of real-world photographs of scenes in which the equipment is installed, includes 3-D measurements to create a dimensionally accurate and photorealistic model of the scene.

6. The method of claim 1, wherein the accessing a database of real-world 3-D images of equipment in a power grid includes images of an identical model of equipment that has been weathered by being outside for various periods of time.

7. The method of claim 1, wherein the accessing a database of real-world photographs of scenes in which the equipment is installed, includes real-world images of the same scene captured at different times of a year and/or different times of a day.

8. The method of claim 1, wherein the accessing a database of real-world 3-D images of equipment in a power grid, further includes applying one of a random weathering or lighting algorithm to the equipment.

9. The method of claim 1, wherein the inserting, with image editing software, the at least one of the real-world 3-D images of equipment into at least one of the scenes includes applying a resizing transform to the at least one real-world 3-D images of equipment to resize it to be consistent with the scene.

10. A system for training a neural network for equipment detection, the system comprising:

a computer memory capable of storing machine instructions; and a hardware processor in communication with the computer memory, the hardware processor configured to access the computer memory to execute the machine instructions for performing a plurality of project projections by:

generating a set of synthetic equipment images by accessing a database of real-world 3-D images of equipment in a power grid, the real-world 3-D images of the equipment include 3-D measurements to create a dimensionally accurate and photorealistic model of the equipment;

accessing a database of real-world photographs of scenes in which the equipment is installed; and inserting, with image editing software, at least one of the real-world 3-D images of the equipment into at least one of the scenes to form a synthetic image based on a combination of the equipment and a scene in which each of the equipment and the scene were previously captured independently of each other;

augmenting the set of synthetic equipment images by applying a random weathering algorithm to the equipment, including one of lighting, color, luminance, or a combination thereof, to create a modified set of synthetic equipment images;

creating a first training set comprising the generated set of synthetic equipment images, the modified set of synthetic equipment images, and the set of real-world photographs of scenes obtained from the database;

training the neural network in a first stage using the first training set;

creating a second training set for a second stage of training comprising the first training set and the set of real-world images of equipment captured together with surrounding scenes of the real-world images in a single image to reduce detections of synthetic images as equipment images after the first stage of training; and training the neural network in the second stage using the second training set.

11. The system of claim 10, further comprising:

appending the synthetic image to a training dataset comprising synthetic images having a common image scene class, wherein the training dataset is used for training the neural network to perform a computer vision task.

12. The system of claim 11, wherein the appending the synthetic image to the training dataset includes inserting a classifier based on the at least one of the real-world 3-D images of equipment inserted into the at least one of the scenes.

13. The system of claim 10, wherein accessing a database of real-world 3-D images of equipment further includes using one or more features of the equipment to search an equipment specification database with physical dimensions; and confirming that the physical dimensions are within a threshold of the 3-D measurements.

14. The system of claim 10, wherein the accessing a database of real-world photographs of scenes in which the equipment is installed, includes 3-D measurements to create a dimensionally accurate and photorealistic model of the scene.

* * * * *